United States Patent [19]

Klein

[11] Patent Number: 4,724,294

[45] Date of Patent: Feb. 9, 1988

[54] PROGRAMMABLE WELDER

[75] Inventor: Robert A. Klein, Wyoming, Mich.

[73] Assignee: D-M Automation, Grandville, Mich.

[21] Appl. No.: 787,783

[22] Filed: Oct. 15, 1985

[51] Int. Cl.[4] .............................................. B23K 11/10

[52] U.S. Cl. .................................. 219/86.7; 219/86.9; 219/87

[58] Field of Search ................... 219/86.25, 86.7, 86.9, 219/87

[56] References Cited

U.S. PATENT DOCUMENTS

| | | | |
|---|---|---|---|
| 3,128,367 | 4/1964 | Darmon et al. | 219/87 |
| 4,267,424 | 5/1981 | Shimatake et al. | 219/86.25 |
| 4,349,718 | 9/1982 | Carota et al. | 219/87 |
| 4,438,309 | 3/1984 | Zimmer | 219/86.25 |
| 4,523,075 | 6/1985 | Horii et al. | 219/87 |

*Primary Examiner*—Clifford C. Shaw

*Attorney, Agent, or Firm*—Price, Heneveld, Cooper, DeWitt & Litton

[57] ABSTRACT

The specification discloses a programmable resistance welder including a work table, a gun assembly, a gun transport mechanism, a weld control, and a master control. The gun assembly and transport mechanism are located entirely above the table. The control is coupled to the gun and transport mechanism to move the gun to desired locations on a workpiece supported on the table and perform a desired weld at each location. In a preferred embodiment, the gun assembly includes adjustably spaced electrodes and a mechanism for rotating the gun assembly.

16 Claims, 6 Drawing Figures

PROGRAMMABLE WELDER

BACKGROUND OF THE INVENTION

The present invention relates to automated welders, and more particularly to programmable automated welders. More particularly still, the invention relates to a novel user-programmable resistance welder especially of the "series-weld" type.

In resistance welding, "spot" welds are produced by coalescence of the workpiece itself into weld "nuggets" which are produced by the heat obtained from the resistance offered by the workpiece to the flow of electric current in a circuit of which the workpiece is a part, as a function of the application of pressure to the workpiece through the welding electrodes during current flow.

Robotic resistance welders have heretofore been developed which automatically repetitively weld identical workpieces. However, such welders have had limited versatility and capability, and have only been capable of making "direct" type of resistance welds, in which a pair of axially aligned mutually spaced welding electrodes receive the workpiece between them and the electrodes are then moved toward one another into contact with opposite sides of the workpiece in order to make a weld.

"Direct" resistance welders have many disadvantages, however, including comparatively high current requirements and resultant high power consumption due to length of weld loop on large panels, the inherent production of unsightly sunken recess areas ("sinks") where each electrode contacts the workpiece (i.e., on both sides of the workpiece), and the requirement of substantial open space on both sides of the workpiece to accommodate the two opposed and mutually aligned electrodes of each set or pair thereof. Because of this alignment requirement, the aligned electrodes are usually fixed in place and the workpiece is moved from point-to-point relative to the workpiece in order to produce welds at the different desired places on the workpiece. Precise control and coordination of the two electrodes located on opposite sides of the workpiece has been extremely difficult, and robotic welders typically have very limited control capabilities, most being designed for a single application and requiring complete mechanical reconfiguration to operate on each different workpiece.

Series-type resistance welding has several characteristics which are preferable to those associated with direct resistance welding, in particular substantially lower power requirements and current flow, and as a result exponentially lower power loss. Additionally, in series-type resistance welding both of the electrodes in a pair or set are located on the same side of the workpiece. This eliminates the difficulties imposed by the requirement of having open and unobstructed areas throughout a substantial volume of space on both sides of the workpiece in which to move the welding.electrodes from point to point over the surface of the workpiece in completing the welding schedule, as is true in direct welding. At the same time, however, the degree of control required for series-type welding is far more demanding and complex than is true for direct resistance welding, since the path for current flow between the electrodes traverses the entire length of the stock between a given pair of weld points, whereas in direct welding the path merely involves current flow through the thickness of the stock. Consequently, since any two given weld points may be located at randomly varying distances from one another, which often involves changes in stock thickness as well, the parameters of current flow and electrode force ("squeeze") will typically change for each ensuing pair of welds, and of course each individual weld in a pair may themselves have different parameters. Of course, as is known to those skilled in the welding art, any given resistance weld may involve a succession of different current flow and squeeze characteristics while the electrode remains generally in position at the weld location, such changes typically being timed by use of line current cycles as the basic time interval, i.e., in varying multiples of one-sixtieth second each. Consequently, the weld command for each given location is likely to be complex, and in the case of series-type resistance welding the added degrees of complexity have, it is believed, heretofore precluded even conceiving of an automated, programmable series-type resistance welder such as the present invention provides.

SUMMARY OF THE INVENTION

The present invention provides a new type of programmable resistance welder, which may be (and preferably is) of the "series" type and which provides substantially greater operational flexibility and capability than prior automated welders, as well as making available the substantially greater efficiency and other benefits characteristics the series mode of resistance welding. In a first aspect of the invention, the programmable welder includes a work table, one or more pairs of welding guns located on the same side of the table, and selectively controllable means for moving the guns with respect to the table to position each such gun at various desired locations on a workpiece. Further provided is a storage device for storing each individual location at which welds are to be performed on the workpiece. A control is coupled to the storage device, the gun transport means and the welding guns to move the welding guns in response to the stored information and position the guns in welding alignment at each of the desired locations. Preferably, the programmable welder further includes a weld control for controlling the current requirements and other welding parameters required in order to effect a series-type resistance weld at each such location. In a preferred aspect, such weld control is under the control of a master control, by which all welding parameters are met to provide the particular desired weld at each particular weld location.

This first aspect of the invention provides an extremely versatile welder which can be easily programmed and reprogrammed to perform welds on a practically infinite variety of workpieces. The storage means enables the welding information to be changed easily. Consequently, the present welder reduces the down time required to "reconfigure" the machine as compared with previous welders. Further, the present welder eliminates the need for a "dedicated" machine for each workpiece.

In a second aspect of the invention, the welder includes a work table, a welding gun assembly having a pair of electrodes, and structure for transporting the guns in two orthogonal directions in a plane generally parallel to the table. Further provided is structure for variably spacing the welding electrodes from one another, structure for reciprocating the electrodes into and out of engagement with a workpiece supported on the table, and means for selectively setting the degree of force, or pressure, with which each electrode engages the workpiece. Preferably, structure is also provided for selectively adjusting the angle of the spaced electrodes with respect to the workpiece at any particular weld location.

This second aspect of the invention enables the welding electrodes to be accurately and efficiently positioned for welding at various locations on the workpiece with a variety of relative electrode positioning, involving both relative spacings, and welding pressures ("squeeze"). This greatly enhances the versatility of the welder, as well as the accuracy with which it is able to position welds on the workpiece.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
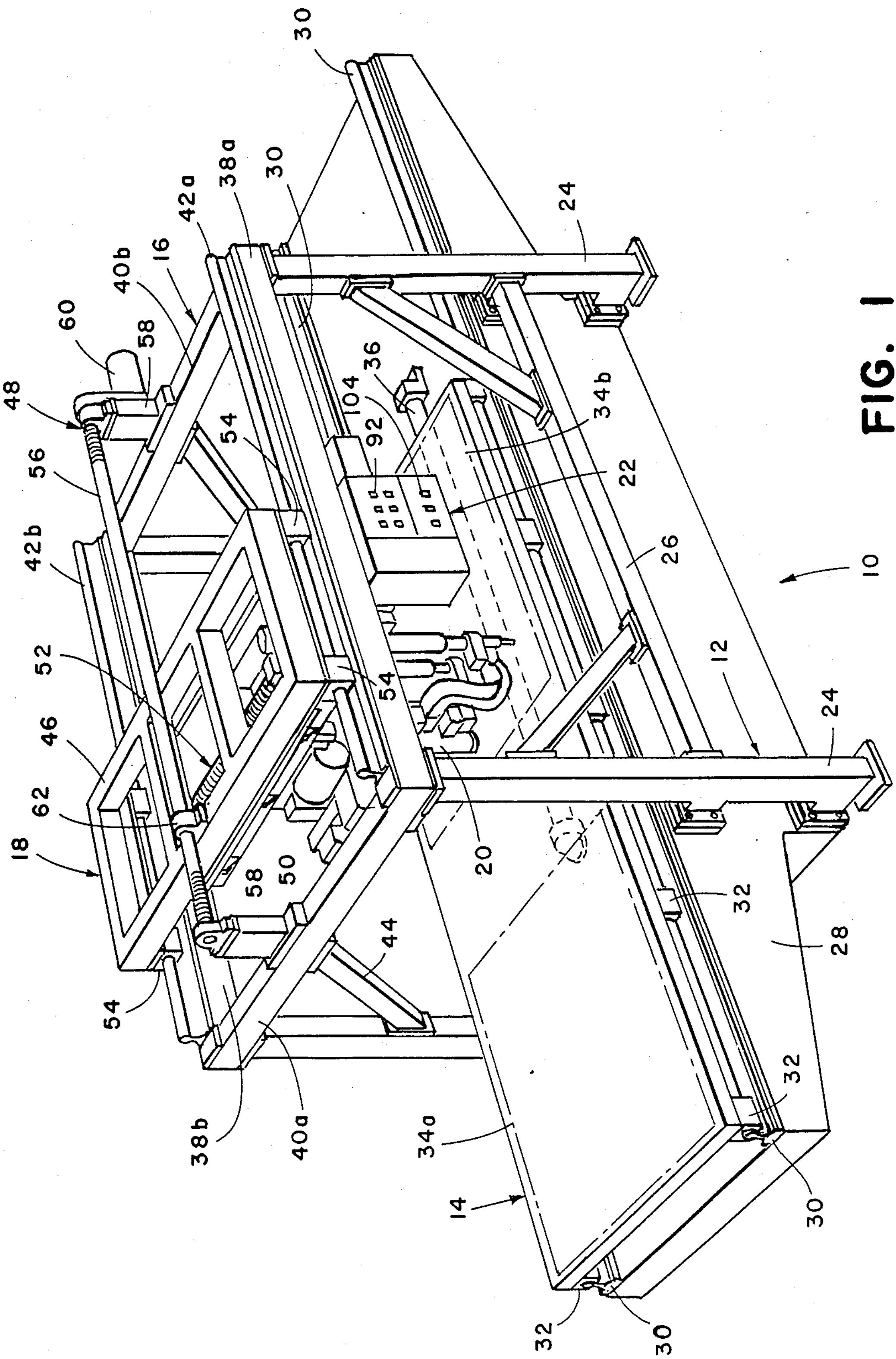
FIG. 1 is a perspective view of the programmable welder of the present invention.

A programmable welder constructed in accordance with one preferred implementation of the invention is illustrated in the drawings, wherein it is generally designated by the numeral 10. The welder 10 (FIG. 1) includes a base 28 to which a frame 12 is attached. Base 28 supports a table 14, and frame 12 supports a bridge 16. Bridge 16 in turn supports a movable carriage 18 which carries a welding gun assembly 20. In use, workpieces and/or fixtures are mounted on table 14, and control apparatus 22 causes carriage 18 (and associated other components described in more detail hereinafter) to transport gun assembly 20 to various locations on the workpiece where the welding gun assembly applies welds to the workpiece. Due to the extensive and accurate control capability provided by the invention, the welds are automatically, rapidly, and accurately applied to the workpiece to produce a product of excellent quality requiring little if any metal finishing.

Turning more specifically to the construction of welding machine 10, frame 12 (FIG. 1) includes four uprights 24 intersecured by appropriate bracing, for example 26, with base 28 attached between opposite pairs of uprights 24. Base 28 movably supports table 14 by a pair of guide shafts or rails 30. In the preferred embodiment, shafts 30, as well as all other guide shafts utilized, are precision shafts of a commercially-available nature. The shafts 30 extend the full length of the base 28. The table 14 is approximately two-thirds as long as the base 28. Linear motion bearing mounts 32 are secured to the undersurface of the table 14 to receive and ride on the shafts 30, thereby permitting the table 14 to undergo accurately-guided longitudinal movement with respect to the base 28. The upper surface of table 14 includes two fixture areas *34a* and *34b* (shown in phantom), one of which is positioned under bridge 16 and the other of which is positioned out from under the bridge in either extreme position of the table The base 28 also supports a rodless air cylinder 36 for transporting the table 14 longitudinally with respect to the base. In the preferred embodiment, cylinder 36 is that sold by Origa Corp. The air cylinder 36 is secured to both the base 28 and the table 14 in conventional fashion (not specifically shown).

Bridge 16 (FIG. 1) is supported on the upper ends of uprights 24. The bridge 16 includes a pair of longitudinal members *38a* and *38b* and a pair of transverse members *40a* and *40b*. A pair of guide shafts *42a* and *42b* are mounted on supports *38a* and *38b*, respectively. Suitable bracing, for example 44, is provided to rigidly interconnect the bridge 16 and the frame 12.

The carriage assembly 18 (FIGS. 1 and 2) includes a rectangular frame 46, X-direction drive mechanism 48, gun frame 50, and Y-direction drive mechanism 52. The carriage frame 46 includes linear motion bearings 54 at its opposite ends which ride on shaft assemblies 42. Consequently, carriage 18 can travel back and forth in a direction parallel to that of table 14. The X-direction drive mechanism includes a long lead screw 56 supported by the bridge 16 on mounts 58 and driven by a D.C. servo motor 60. A ball nut 62 is fixedly secured to carriage frame 46 to cooperate with and follow the helical thread on lead screw 56. In the preferred embodiment, all ball screws such as 56 and all ball nuts such as 62 may be those manufactured and sold under the trademark "WARNER" by The Warner Electric Co. The position of the carriage frame 46 on the rails 42 is precisely controlled through D.C. servo motor 60.

The gun assembly carriage 50 (FIGS. 2 and 3) supports the gun assembly 20. The gun carriage 50 has a generally square frame including a pair of end members *64a* and *64b* and a pair of side members *66a* and *66b*. A pair of guide shaft assemblies *68a* and *68b* are secured to the underside of carriage 46. Linear motion bearings 70 are secured to the gun carriage frame 50 to ride on the guide shaft assemblies *68a*, *68b* and thus provide movement of the gun carriage frame 50 with respect to the carriage frame 46.

Figure 2:
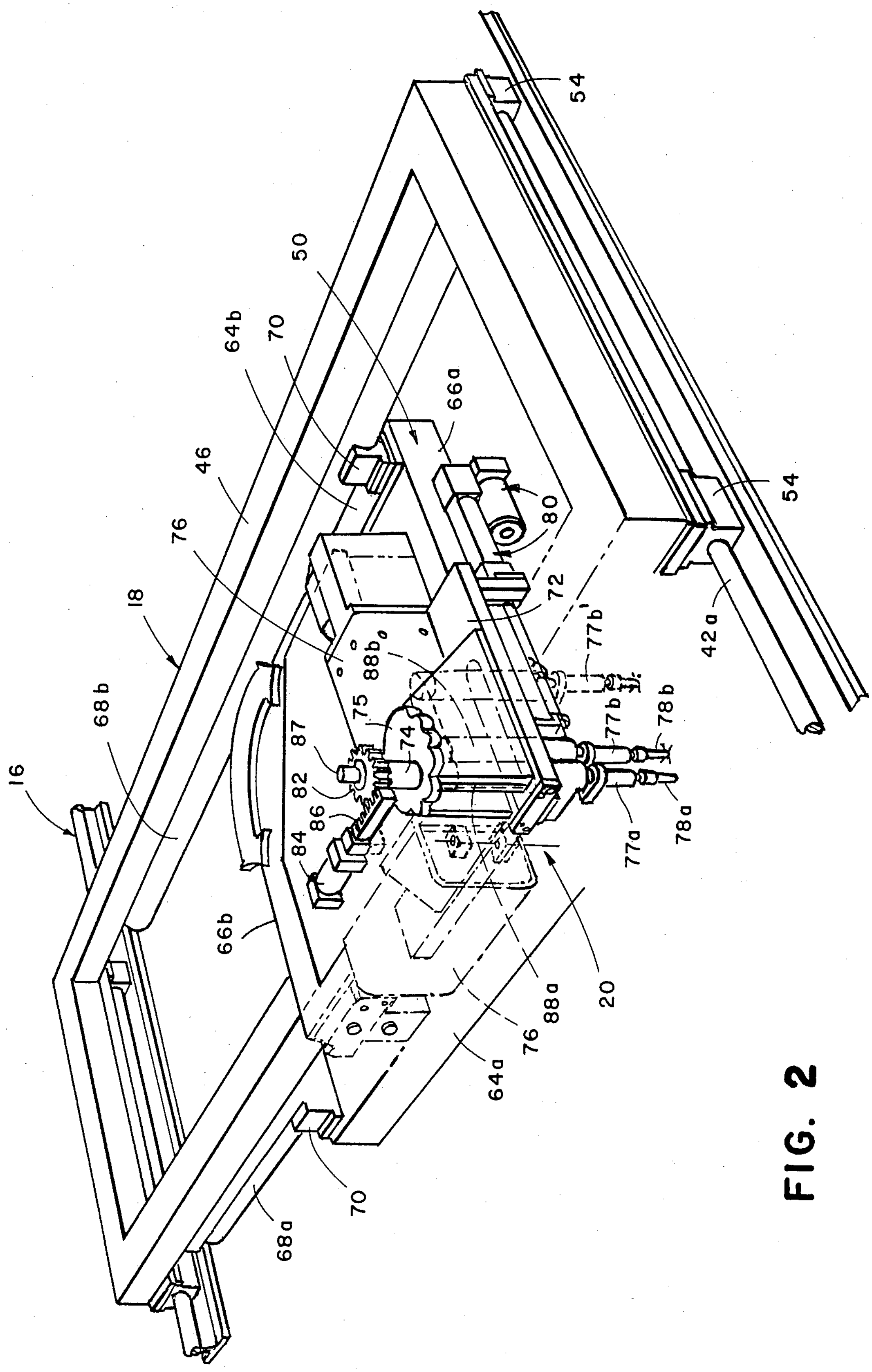
FIG. 2 is a perspective view of the welding gun assembly, with the bridge structure shown in phantom.
Figure 3:
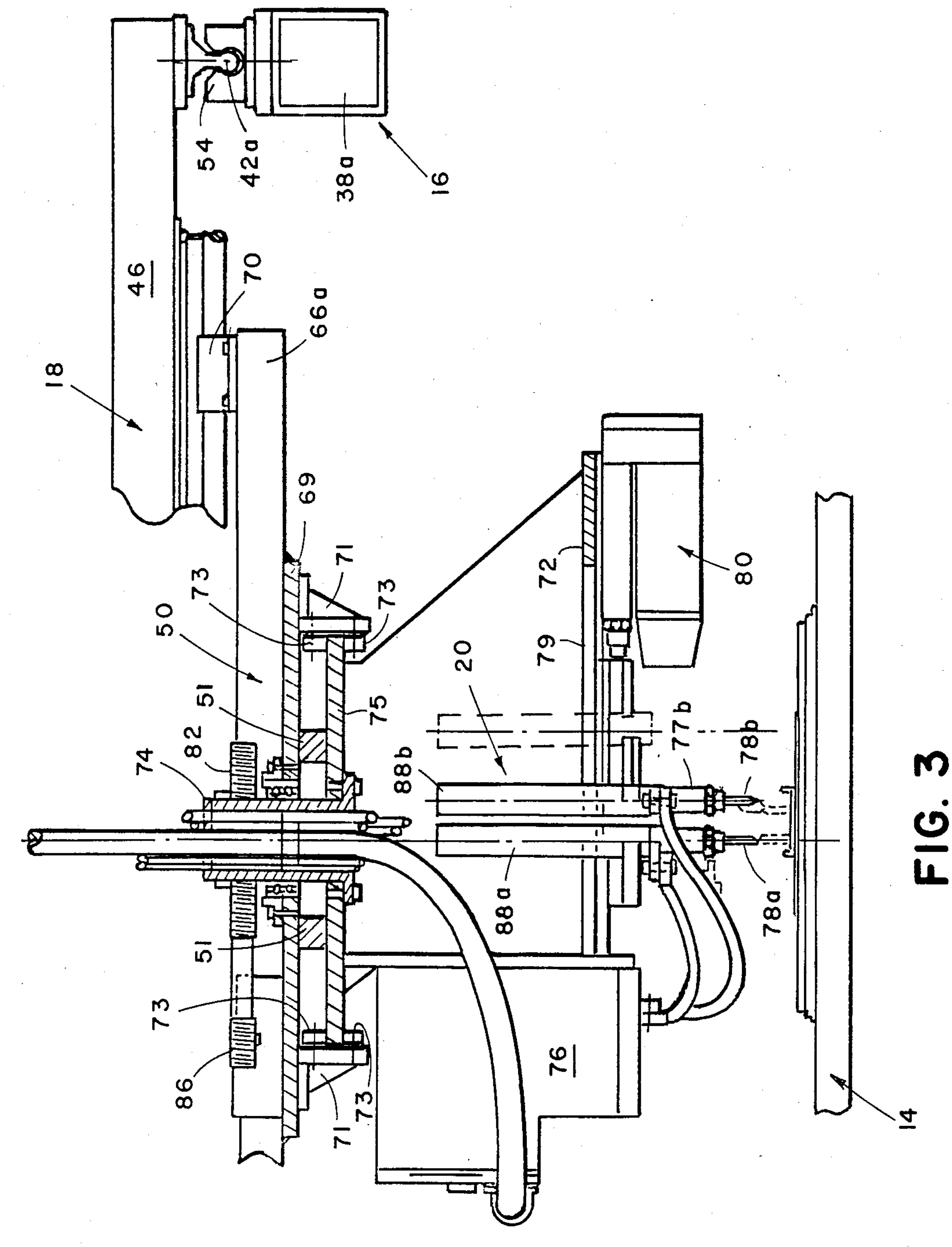
FIG. 3 is an enlarged, fragmentary side elevational view showing portions of the welding gun assembly and bridge structure in association with related parts of the overall apparatus.

The gun assembly 20 (FIGS. 2 and 3) includes a support plate 72 and associated structure which is pivotally suspended from the gun carriage frame 50 by a shaft or column 74. The base plate 72 supports a weld. transformer 76 and the aforementioned welding guns *77a* and *77b*, including welding electrodes *78a* and *78b*, respectively. In a preferred embodiment, the transformer 76 may be that sold under the mark ROMAN by Roman Mfg. Co.; the guns 77 may be those sold under the mark SAVAIR by Savair Products; and the electrodes 78 may be those sold under the mark TUFFALOY by Tuffaloy Products. The primary gun *77a* is generally axially aligned with column 74, such that base plate 72 pivots about primary gun *77a*. The secondary gun *77b* is reciprocable with respect to the primary gun *78a* along an elongated guide slot 79, to vary the spacing between the guns from approximately two to approximately eight inches. In FIGS. 2 and 3, the smallest spacing is illustrated, while a greater spacing is illustrated with the secondary gun shown in phantom as *77b'*. The secondary gun *77b* is moved along slot 79 by a linear actuator (for example a ball screw) and D.C. servo motor combination 80 generally identical except for size to those previously described. It should be noted that there may be, in accordance with other more complex embodiments of the invention, one or more additional pairs of guns such as those just described, designated *77a* and *77b*. Each such additional pair of guns may have its own guide slot and actuating means, and be movable independently of one another, thereby providing greater welding capacities and speed for the overall apparatus.

Column 74 has a pinion 82 secured coaxially to it near its top, and an air cylinder 84 (FIG. 2) or other such controlled drive (e.g., a D.C. servo motor) is fixedly secured to the gun carriage frame 50 to rotate pinion 82 by means of a rack 86, to thereby rotate the entire gun assembly about column 74. That is, actuation of air cylinder 84 will rotate both column 74 and a turntable 75 (FIG. 3) which is secured thereto. Turntable 75 is rotationally suspended beneath gun carriage 50 by rotatable rollers or bearings 73 which are axially secured to mounts 71 fixed to the underside of a mounting plate 69 secured to the bottom of gun carriage members 64*a, b* and 66*a, b*. That is, the periphery of turntable 75 fits between rollers 73, and may freely turn upon them whenever column 74 is rotated. Rotation of turntable 75 simultaneously rotates the support plate 72, which is suspended from turntable 75 by depending side plates 71. In turn, rotation of support plate 72 rotates the welding guns 77, particularly secondary guns *77b*, through an arc of up to 90 degrees. Preferably, column 74 has an axial passage (FIG. 3) through which electrical supply cable 87 (and other desired such elements) may pass, to afford more easy access to transformer 76, pressure transmitters 88, etc. As already indicated, the air cylinder 84 could be replaced by a D.C. servo motor and gear reducer, for precise incremental angular shifting of the guns, up to 180 degrees.

Each of the guns *77a* and *77b* is reciprocably movable along its longitudinal axis by air cylinders 88*a* and 88*b*, respectively. Each of the air cylinders 88 is supplied with air pressure from a controllable source, preferably an electric/pressure transducer which reduces the primary air supply to an output directly proportional to an electric signal. In the preferred embodiment, such transducers are those sold under the trademark BELLOFRAM by Bellofram Corporation. The air cylinders further include pressure transmitters (not specifically shown) which provide a signal to the master control proportional to the actual pressure within the cylinders. The control will not permit welding to occur until the pressure transmitters indicate that appropriate pressure has been applied. The pressure transmitters utilized in the present invention are preferably those sold under the trademark ASHCROFT DURATRAN by Dresser Industries.

It will be appreciated that the pressure transmitters 88 will, upon actuation, apply a predetermined (and selected) downward pressure to the welding guns 77, which correspondingly forces the welding electrodes 78 against the workpiece with an appropriate weld pressure required to accomplish a given weld. Such downward pressure obviously generates an equal and opposite upward pressure. In accordance with a preferred embodiment of the invention, this upward pressure is applied directly to the gun frame 50, and in turn the carriage 18, rather than to, or through, the rotational coupling members suspending the gun assembly beneath the frame. More particularly, an abutment in the form of a spacer ring or "heel ring" 51 (FIG. 3) is secured between turntable 75 and support plate 69, with a clearance between these components which is less than that between the upper surface of the turntable periphery and the rollers 73. Thus, when the pressure transmitters are actuated, the downward force generated is borne by the heel ring 51, rather than by the rollers 73, and no component of such force is applied to the column 74 or its pinion 82, etc.

It should be particularly noted that all welding gun components and means for moving and positioning the welding guns are mounted on (i.e., supported by) the bridge 16 and are thus located on a common side of the table 14. This construction eliminates the need for tandem mechanisms disposed both above and below the table, and thus eliminates the need for all of the open space which would be required beneath the table in a direct-type resistance welder, in which electrodes are positioned in axial alignment with one another on opposite sides of the table.

As thus far described, the position of the guns, as well as the spacing between the guns, can be adjusted at a speed in each ball screw direction of 600 inches per minute, with a repeatable accuracy of 0.005 inch. The air pressure applied to the gun cylinders (pressure transmitters) can be varied between 46 pounds per square inch (psi) and 110 psi in thirty-two 2-psi increments. The apparatus therefore operates extremely rapidly and accurately with respect to known machines to produce products of extremely high quality.

Figure 4:
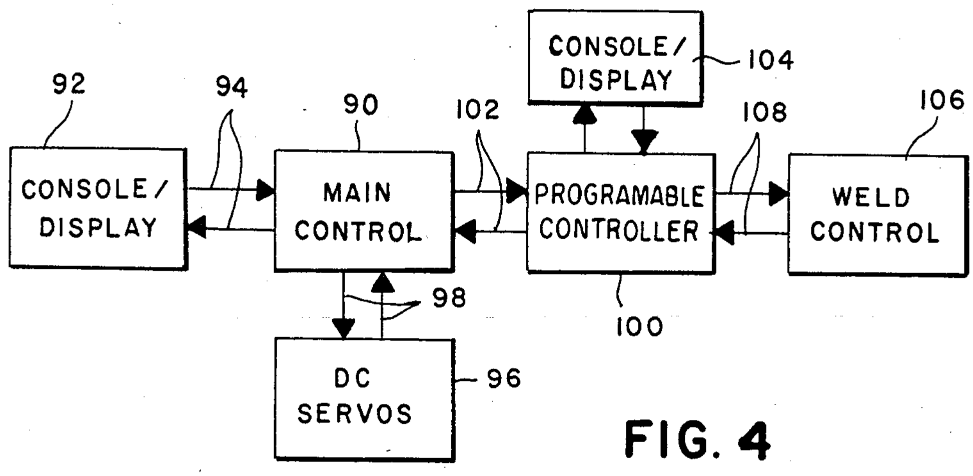
FIG. 4 is a schematic diagram of the control components.

The control system for the present automated welder is illustrated in FIG. 4. The heart of the control system is the main control 90 which in the preferred embodiment is a CNC controller such as that sold by Industrial Information Controls, Inc. The main control 90 is coupled to the console/display 92 (see also FIG. 1) through buses 94. Main control 90 is also coupled to all D.C servo motors 96 through buses 98. Finally, the main control 90 is coupled to a programmable controller 100 through buses 102. The programmable controller in the preferred embodiment is that sold by Allen Bradley Company or by Gould, Inc. The programmable controller 100 in turn controls a multi-schedule weld control 106 of a commercially-available nature through buses 108. Weld control 106 may, in a preferred embodiment, be a device made by Weltronic Company, such as their model WT-580 or WT-900. These devices include a control display component, which is designated by the numeral 104 in FIG. 4 and shown coupled to the weld control 106 by buses 107 (although in practice such control/display may be integrated into the weld control and appear as an integral part thereof).

The weld control 106 is a commercially known digital weld controller which is capable of storing up to 15 different weld schedules, each defining a timed sequence of steps for producing a different weld suited to different workpiece structures. Each weld schedule is individually programmable through the console display 104 and can include a large number of steps (up to forty, with the Weltronic WT-900 control. The different weld schedules are needed to provide up-slope, down-slope, pulsation, preheat, post-heat, and spot annealing steps required to produce a given weld under particular conditions of stock thickness, electrode spacing, types of metals being welded, etc. By way of example only, the welds set forth in Table 1 generally illustrate the types of welds possible.

TABLE 1

| Type No. | Step No. | Number of Cycles | Percent Power | Description |
|---|---|---|---|---|
| Standard Weld | | | | |
| 1 | 0 | 1 0 | 0 0 | 10 cycles squeeze |
| 1 | 1 | 1 2 | 6 0 | 12 cycles at 60% weld |
| 1 | 2 | 1 0 | 0 0 | 10 cycles hold |
| 1 | 3 | 0 0 | 0 0 | finish |
| Up Slope Weld | | | | |
| 2 | 0 | 2 5 | 0 0 | 25 cycles squeeze |
| 2 | 1 | 0 1 | 2 0 | 1 cycle at 20% weld |
| 2 | 2 | 0 1 | 2 5 | 1 cycle at 25% weld |
| 2 | 3 | 0 1 | 3 0 | 1 cycle at 30% weld |
| 2 | 4 | 0 1 | 3 5 | 1 cycle at 35% weld |
| 2 | 5 | 0 5 | 4 0 | 5 cycles at 40% weld |
| 2 | 6 | 2 5 | 0 0 | 25 cycles hold |
| 2 | 7 | 0 0 | 0 0 | finish |
| Impulse Weld | | | | |
| 3 | 0 | 0 5 | 0 0 | 5 cycles squeeze |
| 3 | 1 | 0 5 | 7 0 | 5 cycles at 70% weld |
| 3 | 2 | 0 3 | 0 0 | 3 cycles hold |
| 3 | 3 | 0 5 | 7 0 | 5 cycles at 70% weld |
| 3 | 4 | 0 3 | 0 0 | 3 cycles hold |
| 3 | 5 | 0 5 | 7 0 | 5 cycles at 70% weld |
| 3 | 6 | 1 5 | 0 0 | 15 cycles hold |
| 3 | 7 | 0 0 | 0 0 | finish |
| Weld With Preheat | | | | |
| 4 | 0 | 2 0 | 0 0 | 20 cycles squeeze |
| 4 | 1 | 0 2 | 1 0 | 2 cycles at 10% heat |
| 4 | 2 | 0 5 | 0 0 | 5 cycles soak |
| 4 | 3 | 1 0 | 6 0 | 10 cycles at 60% weld |
| 4 | 4 | 2 0 | 0 0 | 20 cycles hold |
| 4 | 5 | 0 0 | 0 0 | finish |
| Weld/Anneal | | | | |
| 5 | 0 | 1 5 | 0 0 | 15 cycles squeeze |
| 5 | 1 | 1 0 | 7 0 | 10 cycles at 70% weld |
| 5 | 2 | 0 5 | 0 0 | 5 cycles hold |
| 5 | 3 | 0 2 | 2 0 | 2 cycles at 20% anneal |
| 5 | 4 | 0 5 | 0 0 | 5 cycles hold |
| 5 | 5 | 0 0 | 0 0 | finish |

Main control 90 stores information relating to the welds to be performed on the workpieces. Main control 90 includes a programmable storage means, for storing information on each of the many different individual welds which a given workpiece may require. That is, for each weld, information is stored regarding location in the X-direction, location in the Y-direction, gun spread, gun rotation, gun pressure, and the identification of the particular weld schedule to be utilized at that location. This information is inputted through console 92.

Figure 5:
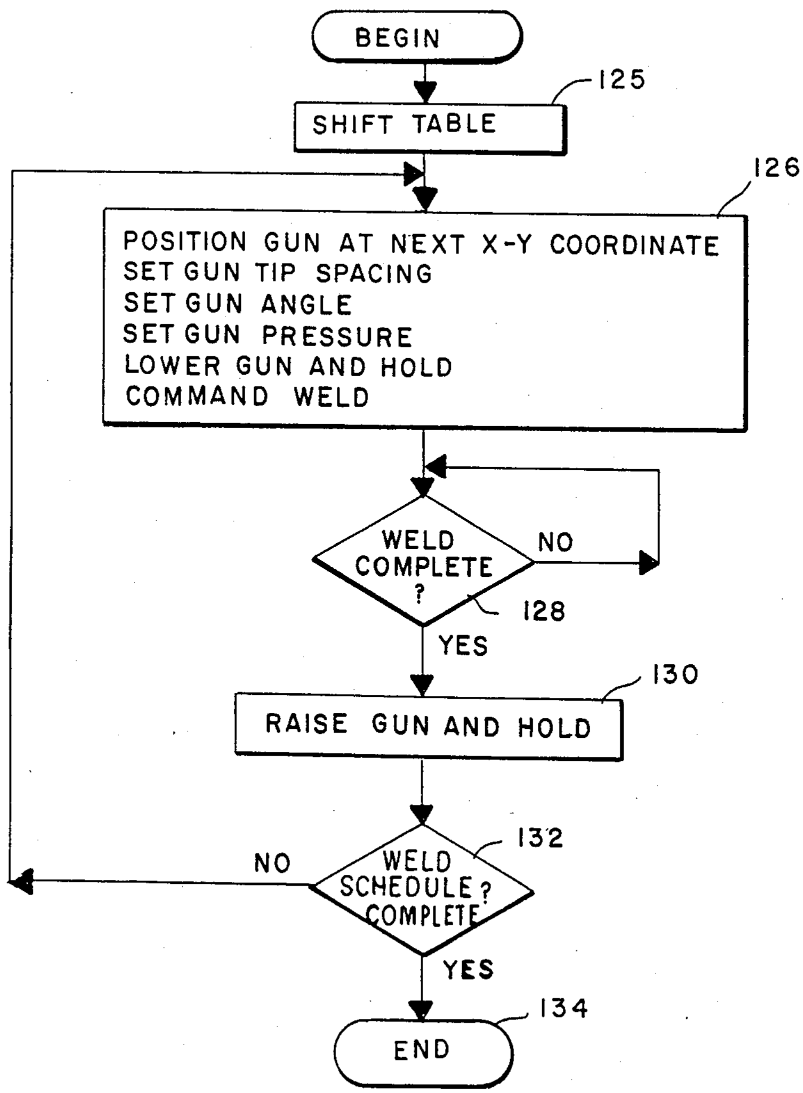
FIG. 5 is a flow chart showing the program flow of the master control.

The program flow of the master control 90 is set forth in FIG. 5. When a workpiece is appropriately positioned on the table 14 (see FIG. 1), a CYCLE START button (not shown) is depressed to initiate the welding sequence. Main control 90 actuates the rodless cylinder 36 to transport (125) the table 14 to its opposite position to orient the new workpiece under the bridge 16. In block 126, the control reads the weld information for the next weld and performs the following functions: (1) positions the gun at the next X,Y coordinate; (2) sets the gun tip spacing; (3) sets the gun angle; (4) sets the gun pressure, (5) lowers the gun, and (6) issues a "weld go" command to the programmable controller 100. At this point, control passes from main control 90 to programmable controller 100 which regulates "machine functions" (such as weld pressure, or "squeeze", etc.) and commands the weld control 106 to perform the weld schedule desired. When the weld is complete (128) and a "weld complete" message is received from controller 100, the main control raises (130) the guns and examines the weld schedule to determine whether it is complete. If the weld schedule is not complete (132), control returns to program flow block 126. If the weld schedule is complete, welding on the workpiece is finished and the program terminates (134).

Figure 6:
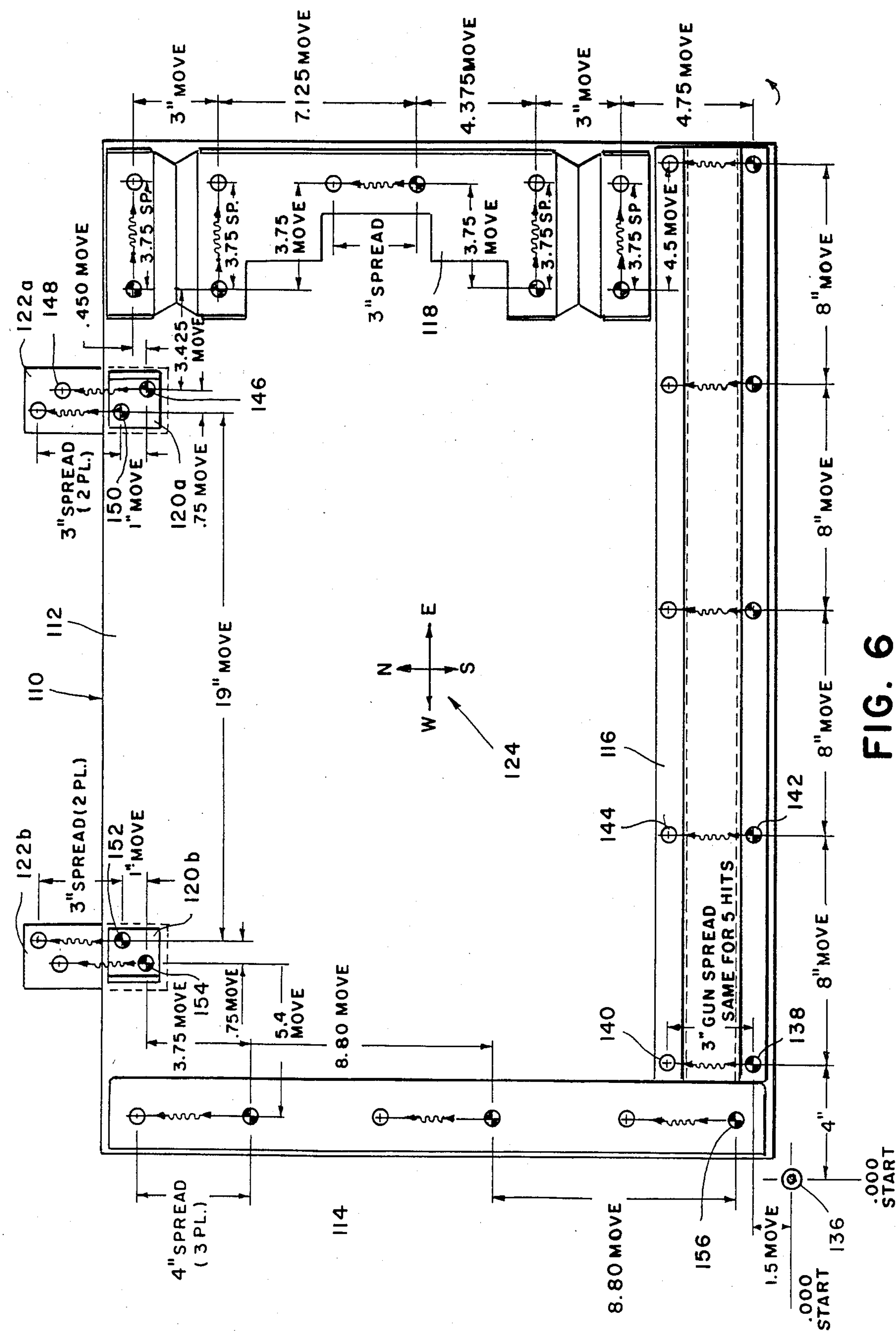
FIG. 6 is a plan view of a workpiece welded by the welder.

An exemplary workpiece welded using the present welder is shown in FIG. 6. The workpiece is a cabinet door 110 having a skin 112, a side rail 114, a stiffener 116, a side bracket 118, and a pair of rod clips **120*a* and 120*b*** all to be welded to the skin. The thicknesses of the materials are as follows:

| Material | Thickness |
|---|---|
| Skin 112 | 0.035 |
| Side Rail 114 | 0.040 |
| Stiffener 116 | 0.030 |
| Side Bracket 118 | 0.050 |
| Rod Clips 120 | 0.072 |

All pieces are fabricated of cold-rolled steel. The side rail 114 and the rod clips 120 are L-shaped in section, while the side bracket 116 is hat-shaped in section. A pair of copper strips or back-ups **122*a* and 122*b* are provided in conjunction with rod clips 120*a* and 120*b***, respectively, to produce indirect welds as will be described.

The information stored in weld control 106 (actually, in its control console/display 104) (FIG. 4) for welds to be performed in workpiece 110 (FIG. 6) is set forth in Table 2. The master control (main control 90 and programmable controller 100) merely calls for a given program (by number). By storing weld information in the weld control console/display 104, the operator may touch up the weld program when and as necessary, without changing the master program in the main CNC control 90. This is a definite advantage to the system, since it allows floor personnel to make the changes in weld parameters necessary for different and varying conditions without having knowledge of programming or schooling in computers, it also allows a computer programmer to write the program without any practical knowledge of weld theory or practice.

TABLE 2

| Weld No. | Primary Gun Position | | | | | | Secondary Gun Position | | Gun | Weld |
|---|---|---|---|---|---|---|---|---|---|---|
| | Incremental | | | | Absolute | | Spread | Rotation | Pressure | Schedule |
| 0 | 0 0 | | | | 0 Home 0 | | 6" Home | N-S Home | 40 psi Home | 0 Home |
| 1 | 1.5 | N | 4.0 | E | 1.5 | 4.0 | 3.0 | N-S | 50 psi | 1 |
| 2 | 0 | N | 8.0 | E | 1.5 | 12.0 | 3.0 | N-S | 50 psi | 1 |
| 3 | 0 | N | 8.0 | E | 1.5 | 20.0 | 3.0 | N-S | 50 psi | 1 |
| 4 | 0 | N | 8.0 | E | 1.5 | 28.0 | 3.0 | N-S | 50 psi | 1 |
| 5 | 0 | N | 8.0 | E | 1.5 | 36.0 | 3.0 | N-S | 50 psi | 1 |
| 6 | 4.75 | N | 4.5 | W | 6.25 | 31.5 | 3.75 | E-W | 60 psi | 2 |
| 7 | 3.0 | N | 0 | W | 9.25 | 31.5 | 3.75 | E-W | 60 psi | 2 |

TABLE 2-continued

| Weld No. | Primary Gun Position Incremental | | | | Primary Gun Position Absolute | | Secondary Gun Position Spread | Secondary Gun Position Rotation | Gun Pressure | Weld Schedule |
|---|---|---|---|---|---|---|---|---|---|---|
| 8 | 4.375 | N | 3.75 | E | 3.625 | 35.25 | 3.0 | N-S | 60 psi | 3 |
| 9 | 7.125 | N | 3.75 | W | 20.75 | 31.5 | 3.75 | E-W | 60 psi | 2 |
| 10 | 3.0 | N | 0 | W | 23.75 | 31.5 | 3.75 | E-W | 60 psi | 2 |
| 11 | 0.45 | S | 3.625 | W | 23.3 | 27.875 | 3.0 | N-S | 65 psi | 4 |
| 12 | 1.0 | N | 0.75 | W | 24.3 | 27.125 | 3.0 | N-S | 65 psi | 4 |
| 13 | 0 | N | 19.0 | W | 24.3 | 8.125 | 3.0 | N-S | 65 psi | 4 |
| 14 | 1.0 | S | 0.75 | W | 23.3 | 7.375 | 3.0 | N-S | 65 psi | 4 |
| 15 | 3.75 | S | 5.4 | W | 19.55 | 1.975 | 4.0 | N-S | 55 psi | 5 |
| 16 | 8.80 | S | 0 | W | 10.75 | 1.975 | 4.0 | N-S | 55 psi | 5 |
| 17 | 8.80 | S | 0 | W | 1.95 | 1.975 | 4.0 | N-S | 55 psi | 5 |
| 1' | (new parameters for next weld) | | | | | | | | | |

The illustrative directions north, south, east, and west correspond to the designation 124 in FIG. 6. The gun pressures and weld types are standard for the material types and thicknesses used. The gun locations, spreads, and rotations are selected according to the desired positions of the welds, with the home gun spacing being six inches and the home gun rotational position being north-south. In FIG. 6, the position of the primary gun is indicated by a circle having two quarter sections darkened, while the position of the secondary gun is indicated by an open circle.

Referring to Table 2, the welding guns always begin at the home position 136 (FIG. 6) which is denominated absolute 0,0. To perform weld No. 1 wherein the primary gun is at location 138 (FIG. 6), the absolute movement required is 1.5 inches north and 4.0 inches east. The primary gun is the reference point for all gun movements. The gun spacing required for weld no. 1 is 3.0 inches, and the rotation remains north-south, to position the secondary gun at position 140. The gun pressure is 50 psi, which is applied to the guns after the electrodes are positioned. The main control 90 then calls for weld schedule "1" to the weld controller 106. After the weld is complete, the guns are raised, and the control conducts weld No. 2. The position of the primary gun at weld No. 2 is indicated as 142. This position is absolute 1.5 north and absolute 12.0 east, which corresponds to an incremental move from the previous weld No. 1 of 0.0 inch north and 8.0 inches east. The gun spacing is 3.0 inches and the angular orientation remains north-south, to position the secondary gun at location 144. After the guns are positioned, 50 psi pressure is applied to the guns and weld schedule "1" is again selected. The control continues through the information in Table 2 to complete the remaining welds, namely Nos. 3–17, after which it proceeds to a new starting position 1' for the next workpiece (or it may if desired return to the home position 136).

As indicated at the outset, the programmable welder in accordance with the invention is particularly suitable for performing more complex welds such as series welds. In Table 2, the series welds include Nos. 1–10 and 15–17. Indirect welds are performed at weld Nos. 11, 12, 13, and 14, because the spacing at these welds (Nos. 146, 150, 152, and 154 in FIG. 5) is such that the minimum gun spread prevents the welds from being performed as series welds. In these cases, copper backup strips 122 are utilized which lay under and engage the skin 112. For example, at weld No. 11, the primary gun is at location 146 (FIG. 5) while the secondary gun is at location 148 on the back-up strip 122*a*. Similarly, for welds No. 12, 13, and 14, the primary gun is positioned at locations 150, 152, and 154, respectively; and the secondary gun engages a back-up strip 122.

In accordance with the foregoing, workpieces are rapidly, accurately, and efficiently welded by use of the present welder. Extremely accurate control of the gun position, electrode spacing, pressure, and weld parameters insure an accurate and precise weld at each location to reduce or even eliminate metal finishing. In this regard, it should be appreciated that the typical recessed "sink" area produced by resistance welding occurs only on the workpiece adjacent the electrode tip; consequently the series-type welds produced in accordance herewith only leave such areas on the top side of the workpiece, the bottom (outer) side remaining unblemished for final finishing.

The reciprocable table 14 enables one workpiece to be set up while another workpiece is being welded. When the table is in the position shown in FIG. 1, a new workpiece is set up in area 34*a* while a second workpiece in area 34*b* is being welded. Suitable fixtures (not shown) are included in both areas to gage and hold the workpieces. After the new workpiece is set up and welding on the second workpiece is complete, table 14 reciprocates to the opposite end of the base 28. The workpiece in area 34*a* is then welded; and the welded workpiece is removed from area 34*b*, and a new workpiece is positioned thereon.

The programmability of the present welder enables a wide variety of welding possibilities. The elements on the two portions of the table can be identical, or the workpieces can be run in pairs, for example with tops being run on one area of the work table while bottoms are run on the other end of the work table. In similar fashion, left and right sides can be welded as can be fronts and backs.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A programmable series-type resistance welding apparatus comprising:

a work table for supporting a workpiece;

at least one pair of mutually cooperative welding guns disposed on the same side of said workpiece, and means for reciprocable movement of said guns into and out of engagement with the workpiece supported on said table;

storage means for storing information corresponding to locations on the workpiece to be welded;

transport means for moving said welding guns from one to another of said welding locations;

control means coupled to said storage means and to said transport means for controlling the transport means to move said welding guns to the different stored locations; and weld schedule control means for cooperatively electrically actuating said pair of welding guns to make a different particularly-specified series-type resistance weld on the workpiece at each of a plurality of predetermined pairs of the said weld locations, each such pair of different series-type weld having its own particular set of weld parameters and such parameters varying from one to another of said predetermined weld locations.

2. A programmable series welding apparatus as defined in claim 1 further comprising means for moving at least one of the welding guns in said pair thereof along a generally arcuated path in a plane generally parallel to that of said work table.

3. A programmable welding apparatus as defined in claim 1 wherein said transport means comprises:

X-direction means for moving said welding guns in an X-direction;

Y-direction means for moving said welding guns in a Y-direction, said X and Y directions being orthogonal to one another and generally parallel to the work table; and further comprising spacing means for adjusting the spacing between said electrodes, said control means further operating to control said spacing means to provide a desired electrode spacing at each weld location independently of X-Y positioning by said X-direction and Y-direction means.

4. A programmable welding apparatus as defined in claim 1 wherein said work table includes first and second workpiece support portions, said table being reciprocatively shiftable between first and second positions wherein one of said workpiece support portions is positioned generally in alignment with said guns to be welded thereby and the other of said workpiece support portions is not so aligned for welding and is instead openly accessable for set up.

5. A program-controlled series-type resistance welding apparatus comprising:

a generally horizontal table;

a welding gun means for welding workpieces supported on the table, said gun means including at least a pair of mutually-separate welding guns and means for cooperatively mounting and carrying said pair of guns;

transport means for transporting said gun-mounting and carrying means and said pair of guns to locations on the workpiece, said welding gun-mounting and carrying means being suspended from said transport means and being located between said transport means and said table;

program-controlled spacing means for altering the spacing between said guns in accordance with a predetermined schedule; and welding transformer means for supplying electrical excitation to said welding guns so that the same produce resistance welds, said transformer means being coupled to and carried with said gun-mounting and carrying means for substantially no relative motion between said guns and said transformer means during said transporting of said guns by said gun-mounting and carrying means from one of said locations to another; whereby electrical connectors between said transformer means and said welding guns may have minimal length and not be subject to twisting and other such motion during said transporting.

6. A resistance welding apparatus as defined in claim 5, further comprising means for rotatably moving at least one of said electrodes about an axis disposed generally orthogonal with respect to said table.

7. A resistance welding apparatus as defined in claim 5 further comprising:

weld control means for controlling power to said gun means to perform series-type welds in accordance with different welding parameters;

storage means for storing information relating to a plurality of welds including, for each weld, weld location and particular weld parameters; and master control means coupled to said storage means, said transport means, and said weld control means for controlling said transport means and said weld control means in response to the stored information to produce welds at the different desired locations having different desired parameters.

8. A resistance welding apparatus as defined in claim 5 wherein said transport means includes means for moving said gun means in two directions generally orthogonal to one another and generally parallel to said table, and wherein said transport means is spaced away from said table and said welding-gun mounting and carrying means and said welding transformer means are disposed between said table and said transport means.

9. A resistance welding apparatus as defined in claim 8 and including means associated with and carried by said welding gun-mounting and carrying means, for reciprocating said welding guns toward and away from said table.

10. A resistance welding apparatus as defined in claim 9 and including program-controlled loading means responsive to said master control means for urging electrodes carried by said guns into engagement with a workpiece supported on the table with predetermined and varying amounts of loading pressure therebetween.

11. A resistance welding apparatus as defined in claim 5 wherein said work table includes first and second work piece support portions, said table being shiftable between first and second positions wherein one of said work piece support portions is positioned to be welded and the other of said workpiece support portions can be easily accessed for set up.

12. A programmable welding apparatus comprising:

a work table;

a welding gun assembly, including welding electrodes;

storage means for storing information related to welds to be performed on a workpiece supported on said work table, the information including, for each weld, the weld location and the welding parameters for each location;

weld control means for controlling the current supplied to said electrodes, said weld control means including storage means for storing a plurality of power patterns each comprising certain of said weld parameters and each corresponding to a particular weld location;

transport means for transporting said electrodes with respect to said table; and master control means coupled to said storage means, said weld control means, and said transport means for controlling said transport means to move said electrodes sequentially to the stored locations and, while holding the electrodes in position at each of the locations, for controlling said weld control means to perform a weld having parameters corresponding to those stored for the different locations.

13. A programmable welding apparatus as defined in claim 12 wherein said gun assembly includes at least a pair of said electrodes, and including spacing means for adjustably spacing the electrodes in said pair from each other, and further wherein said master control means is coupled to said spacing means for controlling the electrode spacing for different welds.

14. A programmable welding apparatus as defined in claim 13 and including means for moving one of said electrodes in an arcuate path with respect to the other thereof in response to commands from said master control means.

15. A programmable welding apparatus as defined in claim 12 and including means for reciprocating said electrodes into and out of engagement with a workpiece supported on said work table, and further wherein said master control means is coupled to said electrode-moving means for controlling the said arcuate path movements between welds.

16. A programmable welding apparatus as defined in claim 12 wherein said work table includes first and second work piece support portions, said table being shiftable between first and second positions wherein one of said work piece support portions is positioned to be welded and the other of said workpiece support portions can be easily accessed for set up.

* * * * *